US010814397B2

(12) United States Patent
Skoropata et al.

(10) Patent No.: US 10,814,397 B2
(45) Date of Patent: *Oct. 27, 2020

(54) TEXTURED-CRYSTAL NANOPARTICLES FROM LIGATED ANIONIC ELEMENT REAGENT COMPLEX

(71) Applicants: Toyota Motor Engineering & Manufacturing North America, Inc., Erlanger, KY (US); The University of Manitoba, Winnipeg (CA)

(72) Inventors: Elizabeth Marie Skoropata, Winnipeg (CA); Michael Paul Rowe, Pinckney, MI (US); Johan Alexander van Lierop, Winnipeg (CA)

(73) Assignees: Toyota Motor Engineering & Manufacturing North America, Inc., Plano, TX (US); The University of Manitoba, Winnipeg (CA)

( * ) Notice: Subject to any disclaimer, the term of this patent is extended or adjusted under 35 U.S.C. 154(b) by 768 days.

This patent is subject to a terminal disclaimer.

(21) Appl. No.: 15/076,247

(22) Filed: Mar. 21, 2016

(65) Prior Publication Data
US 2017/0266730 A1   Sep. 21, 2017

(51) Int. Cl.
*B22F 9/30* (2006.01)
*B22F 1/00* (2006.01)
(Continued)

(52) U.S. Cl.
CPC .............. *B22F 9/30* (2013.01); *B22F 1/0044* (2013.01); *C07F 19/00* (2013.01);
(Continued)

(58) Field of Classification Search
CPC ................................ B82Y 40/00; B22F 1/044
See application file for complete search history.

(56) References Cited

U.S. PATENT DOCUMENTS 7,041,350 B1   5/2006   Rule et al.
7,785,392 B2   8/2010   Shim et al.
(Continued)

FOREIGN PATENT DOCUMENTS

JP   2012038697 A   2/2012
JP   2013073839 A   4/2013
(Continued)

OTHER PUBLICATIONS

Chen et al., "Improved Dehydrogenation Properties of Ca(BH4)2•nNH3 (n = 1, 2, and 4) Combined with Mg(BH4)2,", Sep. 2012, J. Phys. Chem., 116, 21162-21168.
(Continued)

*Primary Examiner* — Christopher S Kessler
*Assistant Examiner* — Jeremy C Jones
(74) *Attorney, Agent, or Firm* — Christopher G. Darrow; Darrow Mustafa PC

(57) ABSTRACT

A method for synthesizing a reagent complex includes a step of ball-milling a mixture that includes: a powder of a zero-valent element; a hydride molecule; and a nitrile ligand. The method produces a reagent complex having a formula $Q^0 \cdot X_y \cdot L_z$, where $Q^0$ is the zero-valent element, X is the hydride molecule, and L is the nitrile ligand. A process for synthesizing nanoparticles composed of the zero-valent element includes a step of adding solvent to the reagent complex. Crystal texture of the nanoparticles is modulated by appropriate selection of the molar ratio nitrile ligand in the reagent complex.

5 Claims, 4 Drawing Sheets

(51) Int. Cl.
*C07F 5/02* (2006.01)
*C07F 19/00* (2006.01)
*B82Y 40/00* (2011.01)
*B82Y 30/00* (2011.01)

(52) U.S. Cl.
CPC ....... *B22F 2301/30* (2013.01); *B22F 2304/05* (2013.01); *B82Y 30/00* (2013.01); *B82Y 40/00* (2013.01)

(56) References Cited

U.S. PATENT DOCUMENTS

| | | | |
|---|---|---|---|
| 8,192,866 | B2 | 6/2012 | Golightly et al. |
| 8,395,003 | B2 | 1/2013 | Leger et al. |
| 8,372,177 | B1 | 2/2013 | Thoma et al. |
| 8,980,219 | B1 | 3/2015 | Rowe et al. |
| 9,142,834 | B2 | 9/2015 | Mohtadi et al. |
| 9,278,392 | B2 * | 3/2016 | Rowe .................. B22F 9/24 |
| 9,281,518 | B2 * | 3/2016 | Singh .................. H01M 4/366 |
| 9,296,043 | B2 * | 3/2016 | Rowe .................. B22F 9/16 |
| 9,546,192 | B2 * | 1/2017 | Rowe .................. B22F 9/20 |
| 9,650,248 | B2 * | 5/2017 | Rowe .................. C01B 6/23 |
| 9,738,536 | B2 * | 8/2017 | Rowe .................. C01B 35/02 |
| 9,796,023 | B2 * | 10/2017 | Rowe .................. H01F 1/0045 |
| 10,023,595 | B2 * | 7/2018 | Rowe .................. C07F 7/30 |
| 2005/0217427 | A1 | 10/2005 | Suthersan et al. |
| 2009/0029148 | A1 | 1/2009 | Hashimoto et al. |
| 2009/0090214 | A1 | 4/2009 | Cheng |
| 2009/0264277 | A1 | 10/2009 | Rishi et al. |
| 2013/0084502 | A1 | 4/2013 | Singh et al. |
| 2015/0068646 | A1 | 3/2015 | Rowe |
| 2015/0098882 | A1 | 4/2015 | Rowe |
| 2015/0098884 | A1 | 4/2015 | Rowe |
| 2015/0098885 | A1 | 4/2015 | Rowe |
| 2015/0098886 | A1 | 4/2015 | Rowe et al. |
| 2015/0098892 | A1 | 4/2015 | Rowe et al. |
| 2015/0099135 | A1 | 4/2015 | Mohtadi et al. |
| 2015/0099172 | A1 | 4/2015 | Rowe et al. |
| 2015/0099183 | A1 | 4/2015 | Singh et al. |

FOREIGN PATENT DOCUMENTS

| | | |
|---|---|---|
| JP | 2013131366 A | 7/2013 |
| WO | WO2012007830 A1 | 1/2012 |
| WO | WO2013056185 A1 | 4/2013 |
| WO | WO2013063161 A2 | 5/2013 |

OTHER PUBLICATIONS

Harris, "X. Quantitative Measurement of Preferred Orientation in Rolled Uranium Bars", Sep. 26, 1951, pp, 113-123, (11 pages).
Imamura et al., "Dehydriding of Sn/MgH2 nanocomposite formed by ball milling of MgH2 with Sn", Jul. 2007, Int. J. Hydrogen Energy, 32, 4191-4194.
Rowe et al., "Ligated Anionic-Element Reagent Complexes (LAERCs) As Novel Reagents", U.S. Appl. No. 14/593,371 filed Jan. 9, 2015.
Rowe et al., "Synthesis of Ferromagnetic Manganese-Bismuth Nanoparticles Using A Vianganese-Based Ligated Anionic-Element Reagent Complex (Mn-LAERC) and Formation of Mulk MnBi Magnets Therefrom", U.S. Appl. No. 14/593,583, filed Jan. 9, 2015.
Schüth et al., "Light Metal Hydrides and Complex Hydrides for Hydrogen Storage", Chem Commun, Sep. 2004, Issue 20, pp. 2249-2258.
Varin et al., "The effects of ball milling and nonmetric nickel additive on the hydrogen desorption from lithium borohydride and manganese chloride (3LiBH4 + MnCl2) mixture", Int. J. Hydrogen Energy, 35 (2010) 3588-3597.
Wronski et al., "A new nanonickel catalyst for hydrogen storage in solid-state magnesium hydrides", 2011, Int. J. Hydrogen Energy,36, pp. 1159-1166.
Shanavas, K.V. et al., "Theoretical study on the role of dynamics on the unusual magnetic properties in MnBi," Scientific Reports, vol. 4 (Nov. 2014) pp. 1-6.

* cited by examiner

TEXTURED-CRYSTAL NANOPARTICLES FROM LIGATED ANIONIC ELEMENT REAGENT COMPLEX

TECHNICAL FIELD

The present technology generally relates to controlling nanoparticle shapes, and more particularly, to methods for controlling nanoparticle shape via a synthetic method using novel reagent complexes.

BACKGROUND

The average "shapes" of crystals, crystallites, and/or nanoparticles can be defined by absolute or relative lengths in three dimensions. In crystallography, and conventional physical chemistry nomenclature, this is often described by Miller indices (hkl). With respect to nanoparticles, the bulk property directly related to particle size and shape can be referred to as "texture".

Differences in the shape of otherwise equivalent (average size, composition) nanoparticles can significantly affect many of their bulk properties. Examples of properties that can be dramatically influenced by shape include, but are not limited to, optical properties, catalytic activity, chemical reactivity, and in the case of pharmacological uses, bioavailability and biodistribution.

Among methods of nanoparticle synthesis that are broadly applicable to a diversity of compositions, few, if any, offer precise control and high variability of shape/texture. Reagents and methods that enable this would be desirable.

SUMMARY

The present technology generally provides a method for synthesizing nanoparticles with control of crystal texture.

In one aspect, the present teachings disclose a method for preparing a reagent complex useful for nanoparticle synthesis. The method includes a step of ball-milling a mixture. The mixture includes a powder of a zero-valent element, a hydride molecule, and a nitrile. The nitrile is present at a molar ratio, relative to the zero-valent element, selected to yield a desired nanoparticle shape. The ball-milling step produces the reagent complex having a formula $Q^0.X_y.L_z$, wherein $Q^0$ is the zero-valent element, X is a hydride molecule, L is the nitrile, y is an integral or fractional value greater than zero, and z is the molar ratio of nitrile relative to the zero-valent element.

The present teachings additionally disclose a process for synthesizing nanoparticles composed of a zero-valent element. The process includes a step of adding a solvent to the aforementioned reagent complex.

In yet another aspect, the present teachings disclose a reagent complex for the synthesis of nanoparticles, the reagent complex having a formula: $Q^0.X_y.L_z$, wherein $Q^0$ is zero-valent element, X is a hydride molecule, L is a nitrile compound, y is an integral or fractional value greater than zero, and z is an integral or fractional value greater than zero.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

Figure 1A:
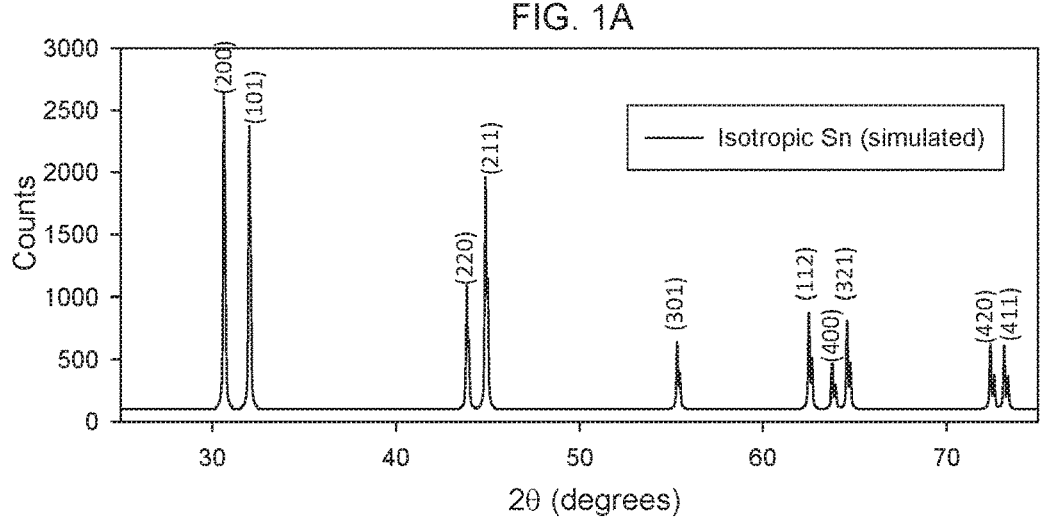
FIG. 1A is a simulated x-ray diffraction (XRD) pattern of isotropic tin nanoparticles.
Figure 1B:
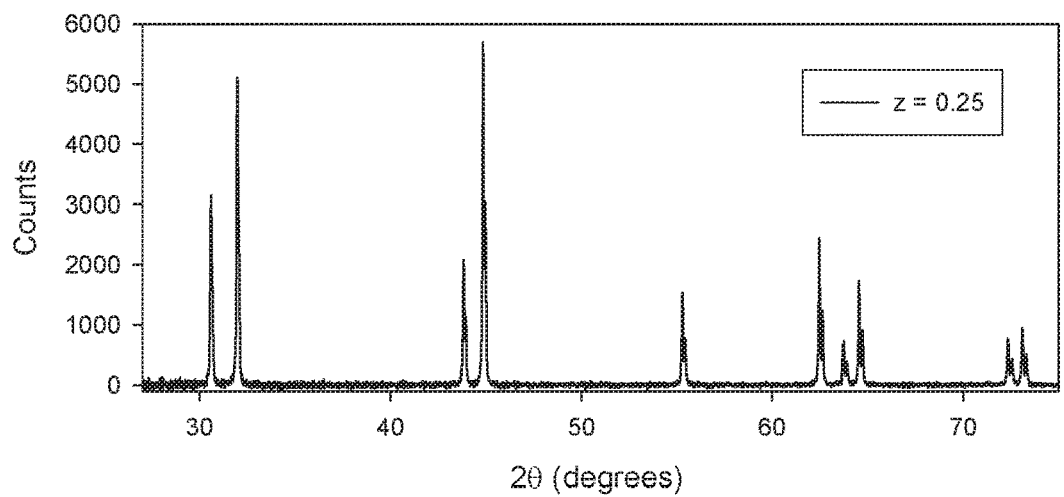
FIG. 1B is an XRD pattern of tin nanoparticles synthesized using a reagent complex having 0.25 mole equivalents of undecyl cyanide relative to zero-valent tin.
Figure 1C:
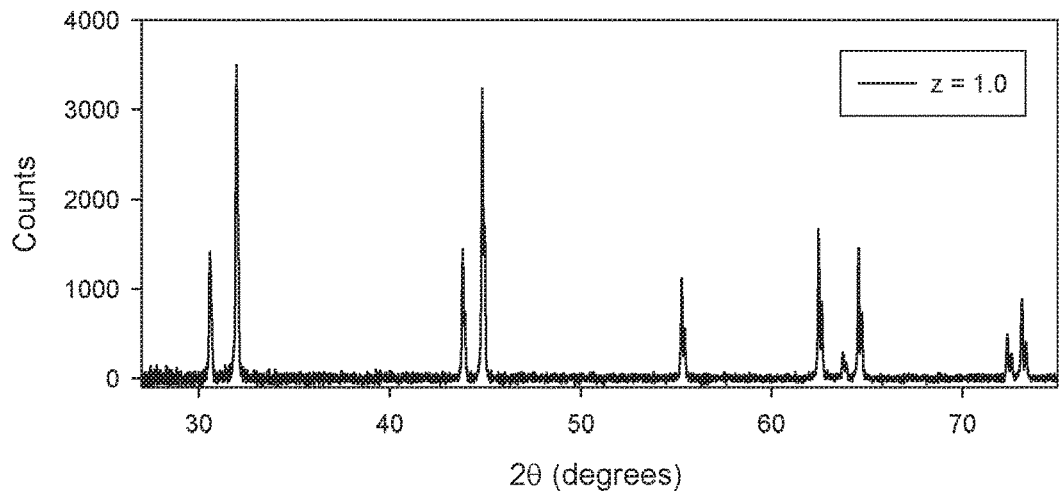
FIG. 1C is an XRD pattern of tin nanoparticles synthesized using a reagent complex having 1 mole equivalent of undecyl cyanide relative to zero-valent tin.
Figure 1D:
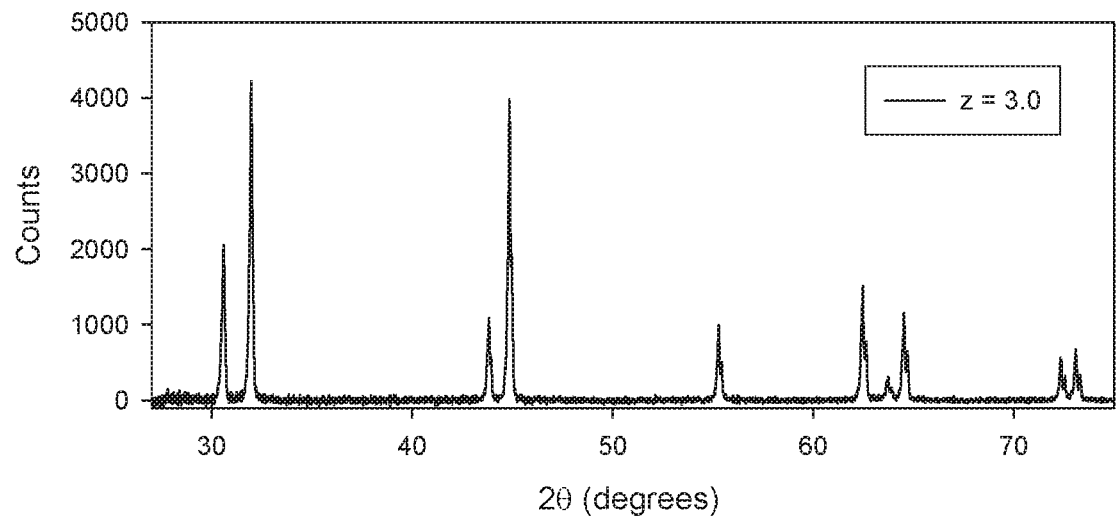
FIG. 1D is an XRD pattern of tin nanoparticles synthesized using a reagent complex having 3 mole equivalents of undecyl cyanide relative to zero-valent tin.
Figure 1E:
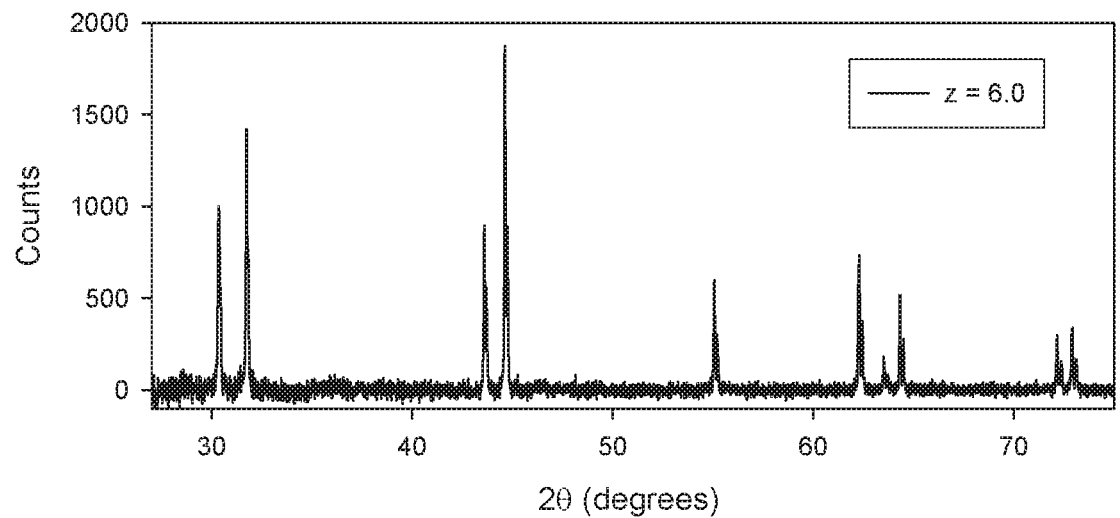
FIG. 1E is an XRD pattern of tin nanoparticles synthesized using a reagent complex having 6 mole equivalents of undecyl cyanide relative to zero-valent tin.

The present disclosure describes methods and reagents for synthesizing nanoparticles composed of one or more zero-valent elements, and for controlling the shape of the nanoparticles so synthesized.

An Anionic Element Reagent Complex (AERC) is a reagent complex that has at least one zero-valent element in complex with a hydride molecule. The inclusion of a nitrile ligand to the complex can improve reactivity. The ligated version of the AERC being referred to as a LAERC. The present teachings demonstrate that modulation of the amount of ligand in the reagent complex can be used to manipulate the shape of nanoparticles synthesized therefrom.

Thus, a method for preparing a reagent complex useful for nanoparticle synthesis is disclosed. In particular, the method allows for control or manipulation of nanoparticles that can be produced from the reagent. The method includes a step of ball-milling a mixture that includes: a powder of a zero-valent element, a hydride molecule, and a nitrile.

The phrase "powder of a zero-valent element" refers to any powder, or composition easily reducible to a powder form, that is composed substantially of at least one zero-valent element. "Zero-valent" refers to the condition of being in oxidation state zero, or elemental form. While much of the following discussion focuses on methods and compositions having a single zero-valent element, it is to be understood that powders of one, two, or more zero-valent elements can be employed simultaneously.

The term "hydride molecule" refers generally to any molecular species capable of functioning as a hydrogen anion donor. In different instances, a hydride molecule as referenced herein can be a binary metal hydride or "salt hydride" (e.g. NaH, or $MgH_2$), a binary metalloid hydride (e.g. BH$_3$), a complex metal hydride (e.g. LiAlH$_4$), or a complex metalloid hydride (e.g. LiBH$_4$ or Li(CH$_3$CH$_2$)$_3$BH). In some examples the hydride molecule will be LiBH$_4$. The term hydride molecule as described above can in some variations include a corresponding deuteride or tritide. The hydride molecule can be present in the mixture at any molar ratio relative to the zero-valent element, and in some implementations can be present in a molar ratio relative to the zero-valent element within a range of 1:1 to 4:1.

The term "nitrile" has its general chemical meaning, and as such refers to a molecule having the formula R—CN. In different implementations, R can be a substituted or unsubstituted alkyl or aryl group, including but not limited to: a straight-chain, branched, or cyclic alkyl or alkoxy; or a monocyclic or multicyclic aryl or heteroaryl. In some implementations, the R group of a nitrile compound will be a straight chain alkyl. In one particular implementation, the nitrile compound will be CH$_3$(CH$_2$)$_{10}$CN, alternatively referred to as dodecane nitrile or undecyl cyanide. As is discussed in greater detail below, the molar ratio in the mixture of nitrile relative to zero-valent element can impact the shape of nanoparticles that may be synthesized using the reagent complex. As such, the amount of nitrile present in the mixture will generally be selected to effect a desired nanoparticle shape.

The term "solvent" refers generally to any molecular species, or combination of molecular species, capable of interacting with the constituents of a LAERC by means of non-bonding or transient-bonding interactions. In different implementations, the solvent used can be a hydrocarbon or aromatic species, including but not limited to: a straight-chain, branched, or cyclic alkyl or alkoxy; or a monocyclic or multicyclic aryl or heteroaryl. In some implementations, the solvent will be a non-coordinating or sterically hindered ether. The term solvent as described can in some variations include a deuterated or tritiated form. In one particular implementation, the solvent used in the synthesis of a LAERC is toluene.

The ball-milling step results in a reagent complex according to Formula I:

$$Q^0 . X_y . L_z \qquad \text{I,}$$

wherein $Q^0$ is the zero-valent element, X is the hydride molecule, L is a nitrile, y is an integral or fractional value greater than zero, and z is an integral or fractional value greater than zero. y and z will be generally be determined by the molar ratios of hydride and nitrile, respectively, present in the mixture relative to zero-valent element. Thus z will be indicative of the amount of nitrile selected to effect the desired nanoparticle shape. A reagent complex of Formula I will alternatively be referred to as a LAERC.

As noted above, two or more zero-valent elements can be included in the ball-milling mixture. Thus it is to be appreciated that $Q^0$ can refer to a single zero-valent element, but in some embodiments can refer to two or more zero-valent elements. In instances where $Q^0$ refers to two or more zero-valent elements, the two or more zero-valent elements can be present in equivalent or different molar quantities. As an example, ball-milling can be performed on a mixture having equimolar quantities of tin, indium, lithium borohydride, and undecyl cyanide, and the specific formula of the reagent resulting from this step would be Sn$^0$In$^0$. LiBH$_4$. [CH$_3$(CH$_2$)$_{10}$CN].

The complexes of the present disclosure can have any supramolecular structure, or no supramolecular structure. Without being bound to any particular structure, and without limitation, the complex could exist as a supramolecular cluster of many zero-valent manganese atoms interspersed with hydride molecules and or nitrile compound. The complex could exist as a cluster of zero-valent manganese atoms in which the cluster is surface-coated with hydride molecules and/or nitrile compound. The complex could exist as individual zero-valent tin or indium atoms having little to no molecular association with one another, but each being associated with hydride molecules and nitrile compound according to Formula I. Any of these microscopic structures, or any other consistent with Formula I, is intended to be within the scope of the present disclosure.

Also disclosed is a process for synthesizing nanoparticles using reagents of the type described above. The process includes a step of adding a solvent to a reagent complex, the reagent complex having the formula described above with respect to Formula I. In some variations, the solvent will be an aprotic solvent. In some variations, the solvent will be an ether. In some variations, the solvent will be THF. In general, the solvent will be chosen for ability to dissolve the nitrile ligand, as well as for minimal reactivity with the hydride molecule.

Without being bound by any particular mechanism, it is believed that addition of the solvent to the LAERC frees bound nitrile ligand from the complex. The dissolved ligand may then oxidize, protonate, or otherwise covalently, datively, or ionically modify the hydride molecule incorporated in the complex, causing the complex to further dissociate and allowing nanoparticles to aggregate. It will be appreciated that the process for synthesizing nanoparticles can beneficially be performed under an anhydrous environment, under an oxygen-free environment, or under an environment that is anhydrous and oxygen-free in some circumstances. For example, the process for synthesizing nanoparticles can be performed under argon gas or under vacuum.

As noted above, the molar ratio of nitrile in the reagent complex can be selected to obtain a desired nanoparticle shape or crystal texture. In an example, tin nanoparticles were synthesized using reagent complexes having the formula Sn$^0$. (LiBH$_4$)$_3$. L$_z$, where L is undecyl cyanide and z is 0.25, 1, 3, or 6. FIG. 1A shows a simulated x-ray diffraction (XRD) pattern of isotropic tin nanoparticles. FIGS. 1B-1E show XRD spectra of the tin nanoparticles synthesized from the aforementioned reagent complexes where z is 0.25, 1, 3, and 6, respectively. Peaks are indexed for reference in FIG. 1A.

Figure 2A:
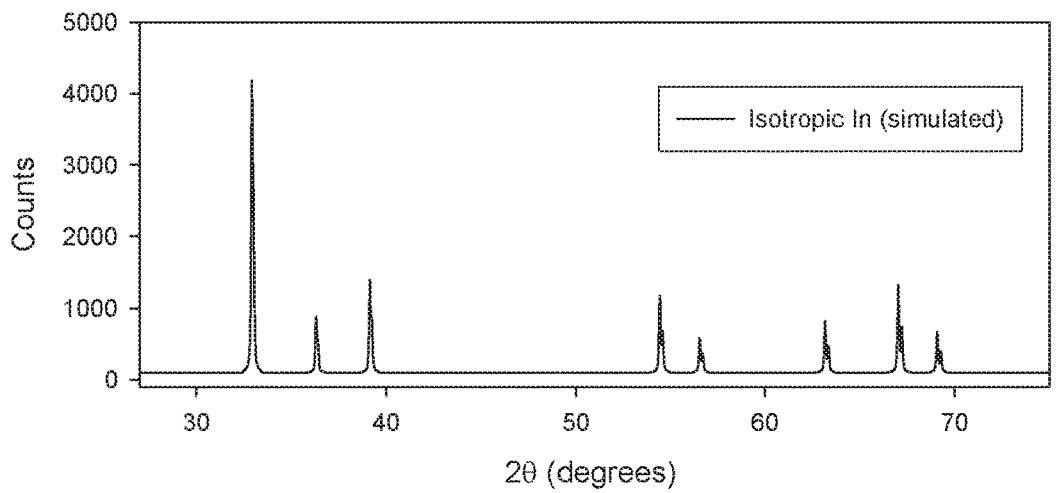
FIG. 2A is a simulated x-ray diffraction (XRD) pattern of isotropic indium nanoparticles.
Figure 2B:
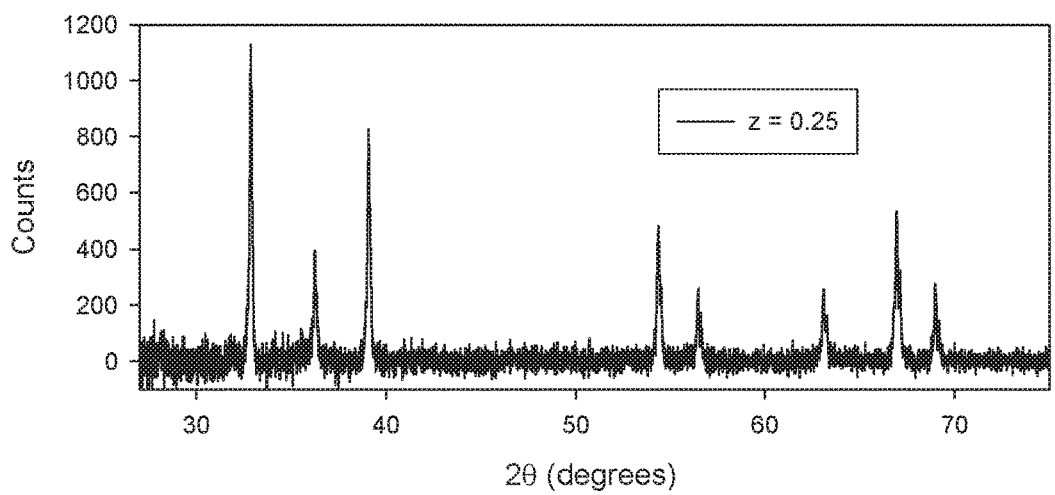
FIG. 2B is an XRD pattern of indium nanoparticles synthesized using a reagent complex having 0.25 mole equivalents of undecyl cyanide relative to zero-valent indium.
Figure 2C:
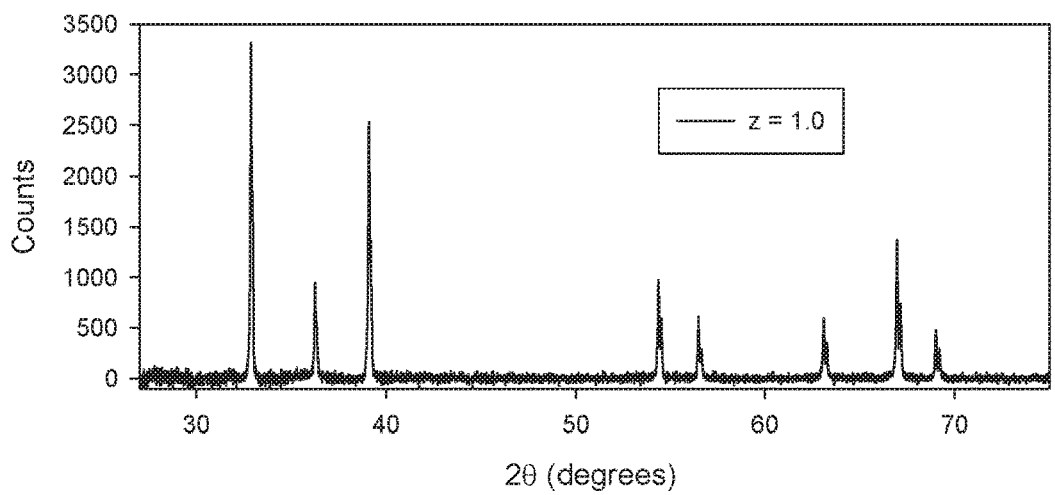
FIG. 2C is an XRD pattern of tin nanoparticles synthesized using a reagent complex having 1 mole equivalent of undecyl cyanide relative to zero-valent indium.

In another example, indium nanoparticles are synthesized using reagent complexes having the formula In$^0$. (LiBH$_4$)$_3$. L$_z$, where L is undecyl cyanide and z is 0.25 or 1. A simulated XRD pattern of isotropic indium nanoparticles is shown in FIG. 2A, while XRD spectra of the nanoparticles synthesized from reagent complexes where z is 0.25 or 1 are shown in FIGS. 2B and 2C, respectively.

The crystal texture can be quantified, for example, using the texture coefficient (T(hkl)) as computed via the Harris method [G. B. Harris, "Quantitative measurements of preferred orientation in rolled uranium bars", Phil. Mag., 424, 113-123 (1952)], from the collected XRD patterns for a series of samples. This identifies which crystal planes were overabundant or underabundent relative to a crystallographically isotropic sample, i.e. crystal planes whose growth is accentuated or inhibited under a given condition.

The calculation of T(hkl) provides the relative degree of preferred abundance among the crystal planes in a nanoparticle, and is calculated by the following equation:

$$T(hkl) = \frac{I(hkl)/I_0(hkl)}{(1/N)\sum I(hkl)/I_0(hkl)}$$

Where I(hkl) and $I_o$(hkl) are the measured and standard (isotropic) integrated intensities from each reflection of the (hkl) crystal plane, and N is the number of reflections observed.

When a crystal is devoid of texture, T(hkl)=1 for all reflections. T(hkl)>1 indicates crystal texture is present, meaning that the identified plane in the crystal structure of the nanoparticle has experienced unnatural, preferential growth.

Figure 3A:
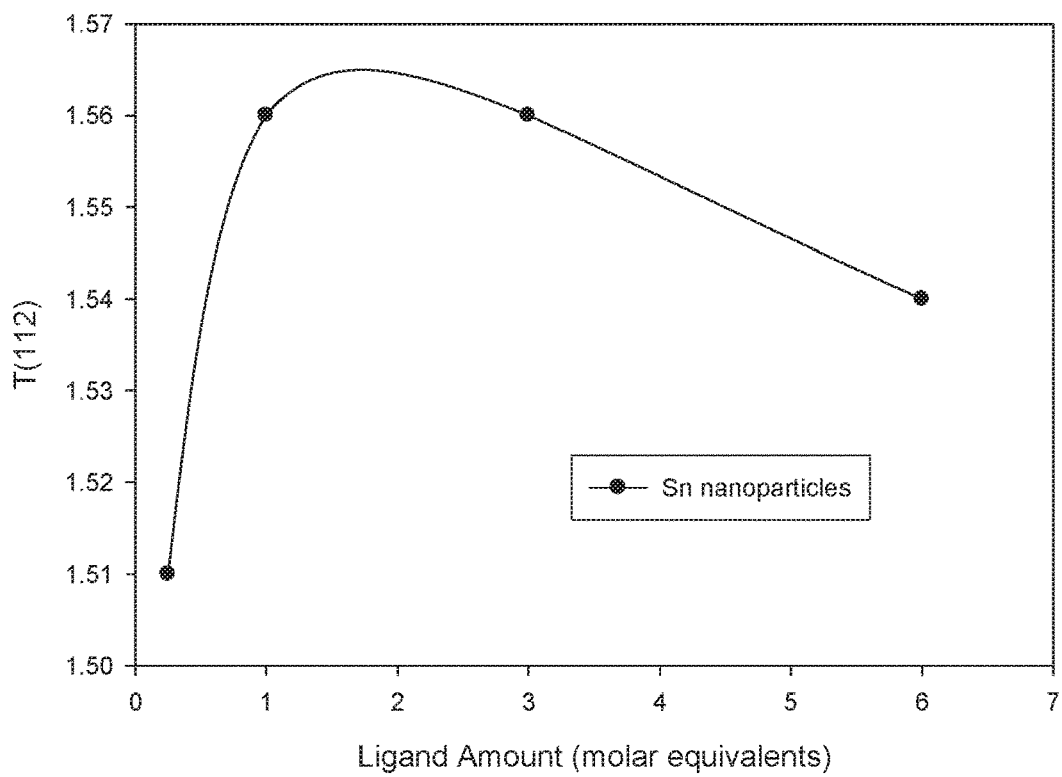
FIG. 3A is a graph of the texture coefficient of the 112 (hkl) plane of the tin nanoparticles of FIGS. 1B-1E as a function of undecyl cyanide stoichiometry in the reagent complexes employed.
Figure 3B:
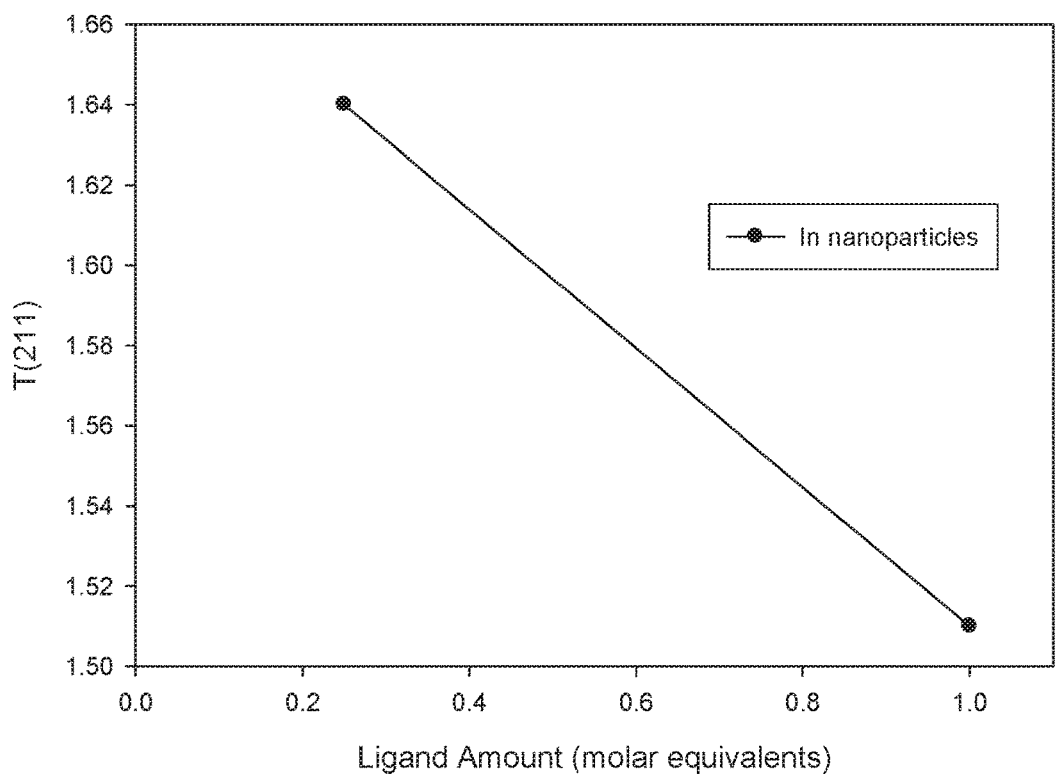
FIG. 3B is a graph of the texture coefficient of the 211 (hkl) plane of the indium nanoparticles of FIGS. 2B and 2C as a function of undecyl cyanide stoichiometry in the reagent complexes employed.

The texture coefficient is plotted as a function of nitrile ligand stoichiometry for the 112 plane in the aforementioned tin nanoparticles and for the 211 plane in the aforementioned indium nanoparticles in FIGS. 3A and 3B respectively. As can be seen in FIG. 3A, the 112 plane is preferentially grown in all samples, reaching a maximum where z in the reagent complex is in a range of about 1-2, and then slowly decreasing at higher ligand stoichiometries.

Thus, it can be seen that the relationship between crystal texture in a nanoparticle and ligand stoichiometry in a LAERC used to synthesize the nanoparticle may differ for different species, however, the relationship is present and is measureable for any species.

In some implementations, methods of the present disclosure can benefit from inclusion of a step of correlating molar ratio of ligand in the reagent complex to a desired nanoparticle shape and/or crystal texture. For example, an analysis like that shown in FIGS. 3A and 3B, above, can be employed to determine a ligand amount that will enhance or suppress crystallite extent in one or more planes.

The present invention is further illustrated with respect to the following examples. It needs to be understood that these examples are provided to illustrate specific embodiments of the present invention and should not be construed as limiting the scope of the present invention.

Example 1. Preparation of Sn-LAERC and In-LAERC

All work is conducted under an inert atmosphere. To a Teflon ball mill jar is added: ceramic balls, Sn or In powder, $LiBH_4$ powder, undecyl cyanide and toluene The relative ratio of ingredients is based upon the formula $Q^0.(LiBH_4)_3.L_z$, where $Q^0$ is tin or indium. z is varied as described above to control the crystal texture of the nanoparticles formed. The ball mill jar is then spun in a planetary ball mill at 160 rpm for 4 hours.

Example 2. Synthesis of Tin and Indium Nanoparticles

Also under inert atmosphere, the LAERC (either Sn-LAERC for Sn nanoparticles or In-LAERC for In nanoparticles) is dispersed in THF for 4 hours and washed with additional THF. The desired nanoparticles are then collected as a precipitate.

The foregoing description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure; various steps may be performed independently or at the same time unless otherwise noted. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A method for preparing a reagent complex for nanoparticle synthesis, the method comprising:
    measuring a correlation between:
        a molar ratio of ligand to zero-valent element in a reagent complex; and
        a crystal texture coefficient of at least one lattice plane (hkl) of nanoparticles synthesized using the reagent complex;
    selecting a molar ratio of ligand to zero-valent element in a reagent complex, the molar ratio based on the correlation from the measuring step and a desired crystal texture coefficient of nanoparticles;
    ball-milling a mixture that includes:
        a powder of a zero-valent element;
        a hydride molecule; and
        a nitrile,
    wherein the nitrile is present, relative to the powder of a zero-valent element, at the selected molar ratio of ligand to zero-valent element, and ball-milling the mixture produces the reagent complex having a formula:

$$Q^0 \cdot X_y \cdot L_z,$$

wherein $Q^0$ is the zero-valent element, X is the hydride molecule, L is the nitrile, y is an integral or fractional value greater than zero, and z is the molar ratio of nitrile relative to the zero-valent element.

2. The method as recited in claim 1, wherein the nitrile comprises undecyl cyanide.

3. The method as recited in claim 1, wherein the hydride molecule comprises a borohydride.

4. The method as recited in claim 1, wherein the hydride molecule comprises lithium borohydride.

5. The method as recited in claim 1, wherein the desired crystal texture coefficient is greater than 1.51.

* * * * *